(12) United States Patent
Lee et al.

(10) Patent No.: US 10,506,452 B2
(45) Date of Patent: Dec. 10, 2019

(54) METHOD FOR CONTROLLING BEAMFORMING ANTENNA TO ENHANCE TRANSMITTING/RECEIVING PERFORMANCE AND WIRELESS COMMUNICATION DEVICE PERFORMING THE SAME IN TDMA-BASED WIRELESS COMMUNICATION SYSTEM

(71) Applicant: GMT Co., Ltd., Seongnam-si, Gyeonggi-do (KR)

(72) Inventors: Ju Hwan Lee, Seoul (KR); Hyung Jin Moon, Gunpo-si (KR)

(73) Assignee: GMT Co., Ltd., Seongnam-si, Gyeonggi-do (KR)

( * ) Notice: Subject to any disclaimer, the term of this patent is extended or adjusted under 35 U.S.C. 154(b) by 143 days.

(21) Appl. No.: 15/385,596

(22) Filed: Dec. 20, 2016

(65) Prior Publication Data

US 2018/0152850 A1 May 31, 2018

(30) Foreign Application Priority Data

Nov. 25, 2016 (KR) .......................... 10-2016-0158643

(51) Int. Cl.
*H04W 16/28* (2009.01)
*H04B 7/06* (2006.01)
*H04B 7/08* (2006.01)

(52) U.S. Cl.
CPC .......... *H04W 16/28* (2013.01); *H04B 7/0617* (2013.01); *H04B 7/086* (2013.01)

(58) Field of Classification Search
CPC ............. H04W 16/28; H04W 72/0446; H04W 72/046
See application file for complete search history.

(56) References Cited

U.S. PATENT DOCUMENTS

| | | | |
|---|---|---|---|
| 2003/0099218 A1* | 5/2003 | Tillotson | H04B 7/2671 370/337 |
| 2003/0193919 A1* | 10/2003 | Cain | H04B 7/0491 370/337 |

(Continued)

FOREIGN PATENT DOCUMENTS

| KR | 1020090058974 A | 6/2009 |
|---|---|---|
| KR | 1020150059104 A | 5/2015 |

OTHER PUBLICATIONS

ITU-R Radiocommunication Sector of ITU, "Technical characteristics for an automatic identification system using time division multiple access in the VHF maritime mobile frequency band", Recommendation ITU-R M.1371-5, Feb. 2014.

*Primary Examiner* — Gregory B Sefcheck
*Assistant Examiner* — Jael M Ulysse
(74) *Attorney, Agent, or Firm* — Envision USA Inc.

(57) ABSTRACT

Provided are a method for controlling a beamforming antenna to enhance transmitting/receiving performance and a wireless communication device performing the same in a TDMA-based wireless communication system. The wireless communication device includes a beamforming antenna, which is configured with omnidirectional antennas, including a central antenna and a plurality of parasitic antennas and a controller controlling a beamforming direction of the beamforming antenna by analyzing a signal received from other station. The method for controlling a beamforming antenna includes analyzing, by a wireless communication device having a beamforming antenna, which is configured with omnidirectional antennas, including a central antenna and a plurality of parasitic antennas, a signal received from other station to control a beamforming direction of the beamforming antenna.

16 Claims, 15 Drawing Sheets

(56) References Cited

U.S. PATENT DOCUMENTS

| | | | | |
|---|---|---|---|---|
| 2003/0214920 A1* | 11/2003 | Cain | .................... | H04B 7/0491 |
| | | | | 370/326 |
| 2004/0032847 A1* | 2/2004 | Cain | .................... | H04B 7/2643 |
| | | | | 370/338 |
| 2004/0196813 A1* | 10/2004 | Ofek | ...................... | H01Q 1/246 |
| | | | | 370/334 |
| 2005/0113116 A1* | 5/2005 | Avidor | ................. | H04B 7/0452 |
| | | | | 455/456.5 |
| 2005/0202859 A1* | 9/2005 | Johnson | ............... | H04B 7/0408 |
| | | | | 455/575.7 |
| 2011/0150066 A1* | 6/2011 | Fujimoto | ............... | H04B 7/086 |
| | | | | 375/224 |
| 2011/0309980 A1* | 12/2011 | Ali | ...................... | H01Q 1/1257 |
| | | | | 342/368 |
| 2013/0229999 A1* | 9/2013 | Da Silva | ................. | H04B 7/04 |
| | | | | 370/329 |
| 2014/0004897 A1* | 1/2014 | Jung | ................... | H04W 72/082 |
| | | | | 455/509 |
| 2015/0289089 A1* | 10/2015 | Raghupathy | ............ | G01S 19/11 |
| | | | | 455/450 |
| 2016/0070001 A1* | 3/2016 | Krantz | .................... | H01Q 1/362 |
| | | | | 342/357.72 |
| 2016/0255603 A1* | 9/2016 | Venkatraman | ......... | G01R 29/10 |
| | | | | 455/456.1 |
| 2016/0337021 A1* | 11/2016 | Sung | .................... | H04B 7/0632 |
| 2016/0366554 A1* | 12/2016 | Markhovsky | ............. | G01S 3/46 |
| 2018/0006379 A1* | 1/2018 | Cariou | .................. | H04W 16/28 |

* cited by examiner

METHOD FOR CONTROLLING BEAMFORMING ANTENNA TO ENHANCE TRANSMITTING/RECEIVING PERFORMANCE AND WIRELESS COMMUNICATION DEVICE PERFORMING THE SAME IN TDMA-BASED WIRELESS COMMUNICATION SYSTEM

CROSS-REFERENCE TO RELATED APPLICATION

This application claims benefit of priority to Korean Patent Application No. 10-2016-0158643 filed Nov. 25, 2016 in the Korean Intellectual Property Office, the disclosure of which is incorporated herein by reference in its entirety.

BACKGROUND OF THE INVENTION

1. Field

The present disclosure relates to wireless communication, and more particularly, to methods for controlling a beamforming antenna and a wireless communication device performing the same.

2. Description of Related Art

Related art time division multiple access (TDMA) type wireless communication is based on a scheme in which transmission terminals transmit signals using different time slots, thus controlling collision and interference.

FIG. 1 is a schematic configuration diagram of a general TDMA-based wireless communication device 100 having an omnidirectional antenna. Referring to FIG. 1, a general TDMA-based wireless communication device 100 having an omnidirectional antenna includes an omnidirectional antenna 110, a transceiver unit 120, a controller 130, a global navigation satellite system (GNSS) reception unit 140, and a GNSS antenna 150.

For example, an automatic identification system (AIS) of a related art maritime wireless communication system has the same structure as that of the general TDMA-based wireless communication device 100 having the omnidirectional antenna illustrated in FIG. 1.

In the case of the AIS in a maritime wireless communication environment, an own station (e.g., a ship station), which has received an AIS message, creates a slot map on the basis of information included in a position report message received from a different station (a different mobile station or a different base station) and, while continuously monitoring slot occupancy status and plan information, secures a transmission-available slot and a candidate slot. With this scheme, however, in a case in which two or more ships are at a distance or in positions over which two or more ships are unable to perform communication with each other, the two or more ships may not be able to share mutual slot occupancy status and plan information. Thus, the two or more ships may simultaneously transmit messages at the same slot time to collide with each other.

FIG. 2 is a view illustrating distance ranges (or communication ranges) of an own station 100 and other mobile stations 100a and 100b. Referring to FIG. 2, the mobile station a 100-a and the mobile station b 100-b are within a communication-available range with the own station 100, and thus, they may be able to communicate with each other. However, a distance between the mobile station a 100a and the mobile station b 100-b is not within the distance range, and thus, the mobile station a 100a and the mobile station b 100-b are not able to communicate with each other. In this example, the mobile station a 100a and the mobile station b 100-b are not able to share a slot occupancy status and plan information with each other as mentioned above. Thus, the mobile station a 100a and the mobile station b 100-b may simultaneously transmit messages at the same slot time, and as a result, the own station may not able to receive both information transmitted from the mobile station a 100a and the mobile station b 100-b due to slot collision and interference.

In the related art, in order to enhance maritime communication efficiency, Korean Patent Application No. 10-2007-0125795 discloses a maritime wireless communication device having sector antennas divided to mutually independently perform transmission and reception on regions formed by dividing an azimuth. Also, Korean Patent Application No. 10-2014-0158290 discloses a directional antenna tracking apparatus using a directional antenna to extend a distance range of a maritime broadband wireless communication device. However, in the related art maritime communication field, a wireless communication device capable of enhancing communication efficiency using an omnidirectional beamforming antenna has not been disclosed yet.

SUMMARY OF THE INVENTION

Therefore, overcoming the problems of the related art, an aspect of the detailed description is to enhance usage efficiency of a network, reduce an error rate through enhancement of transmitting/receiving performance, and extend a distance range (or a communication range in a time division multiple access (TDMA) based wireless communication system, in particular, in a maritime wireless communication system. To this end, an aspect of the present disclosure provides a method for controlling a beamforming antenna to enhance transmitting/receiving performance in a wireless communication system using slot occupancy and plan information and received signal strength indication (RSSI), and a wireless communication device performing the same.

According to an aspect, a wireless communication device performing a method for controlling a beamforming antenna to enhance transmitting/receiving performance in a TDMA-based wireless communication system is provided. The wireless communication device may include: a beamforming antenna, which is configured with omnidirectional antennas, including a central antenna and a plurality of parasitic antennas; and a controller controlling a beamforming direction of the beamforming antenna by analyzing a signal received from other station.

The controller may control a beamforming direction of the beamforming antenna on the basis of a received signal strength indication (RSSI) and slot occupancy status and plan information of the received signal.

The controller may include: a received signal strength indication (RSSI) determining unit determining whether the other station has transmitted a signal by comparing an RSSI of the received signal with a predetermined reference value; a slot map creating unit creating a slot map by analyzing the received signal; an antenna controller generating control information of the beamforming antenna using the result of determining whether a signal has been transmitted and the slot map; and an antenna driving unit enabling the beamforming antenna to form a beam according to the control information.

The RSSI determining unit may compare the RSSI of the received signal with the predetermined reference value, and when the RSSI is equal to or greater than the predetermined reference value, the RSSI determining unit may create reception direction information including a corresponding slot time and a reception direction.

The slot map creating unit may create a slot map by analyzing the slot occupancy status and plan information from the received signal.

The antenna controller may create the control information to form the beam in a direction designated in a specific slot time on the basis of the reception direction information and the slot map.

The antenna driving unit may form the beam in a direction designated in a specific time slot by controlling the parasitic antennas of the beamforming antenna on the basis of the control information.

The antenna driving unit may track signals from other station by rotating a beam of the beamforming antenna at about 360° at every slot time when a reception mode starts or during a slot time in which information of other station is not present in the control information.

The wireless communication device may further include: a transmission/reception unit receiving or transmitting a signal through the beamforming antenna; a global navigation satellite system (GNSS) reception unit receiving satellite signals from GNSS satellites through a GNSS antenna and transferring at least one of time, location, and synchronization information to the controller; and a GNSS antenna.

The transmission/reception unit may include: a transmission unit transmitting at least one of an automatic identification system (AIS) signal, an application specific message (ASM) signal, and a VHF data exchange (VDE) signal; and a reception unit receiving at least one of an AIS signal, an ASM signal, a VDE signal, and a satellite (SAT) signal.

In another aspect, a method for controlling a beamforming antenna to enhance transmitting/receiving performance in a TDMA-based wireless communication system is provided. The method for controlling a beamforming antenna may include: analyzing, by a wireless communication device having a beamforming antenna, which is configured with omnidirectional antennas, including a central antenna and a plurality of parasitic antennas, a signal received from other station to control a beamforming direction of the beamforming antenna.

In the controlling of a beamforming direction, a beamforming direction of the beamforming antenna may be controlled on the basis of a received signal strength indication (RSSI) and slot occupancy status and plan information of the received signal.

The controlling of a beamforming direction may include a first operation of determining whether the other station has transmitted a signal by comparing an RSSI of the received signal with a predetermined reference value; a second operation of creating a slot map by analyzing the received signal; a third operation of generating control information of the beamforming antenna using the result of determining whether a signal has been transmitted and the slot map; and a fourth operation of enabling the beamforming antenna to form a beam according to the control information.

In the first operation, the RSSI of the received signal may be compared with the predetermined reference value, and when the RSSI is equal to or greater than the predetermined reference value, reception direction information including a corresponding slot time and a reception direction may be created.

In the second operation, a slot map may be created by analyzing the slot occupancy status and plan information from the received signal.

In the third operation, the control information may be created to form the beam in a direction designated in a specific slot time on the basis of the reception direction information and the slot map.

In the fourth operation, the beam may be formed in a direction designated in a specific time slot by controlling the parasitic antennas of the beamforming antenna on the basis of the control information.

In the fourth operation, when a reception mode of the wireless communication device starts or during a slot time in which information of other station is not present in the control information, signals from other station may be tracked by rotating a beam of the beamforming antenna at about 360° at every slot time.

The method may further include: receiving or transmitting a signal through the beamforming antenna; and receiving satellite signals from global navigation satellite system (GNSS) satellites through a GNSS antenna and transferring at least one of time, location, and synchronization information to a controller.

In another aspect, a VHF data exchange system (VDES) transmission/reception device transmitting or receiving at least one of an automatic identification system (AIS) signal, an application specific message (ASM) signal, a VHF data exchange (VDE) signal, and a satellite (SAT) signal. The VDES transmission/reception device may include: a beamforming antenna which is configured with omnidirectional antennas, including a central antenna and a plurality of parasitic antennas; and a multi-functional transmission/reception processor, wherein the multi-functional transmission/reception processor controls a beamforming direction of the beamforming antenna by analyzing a signal received from other station.

The VDES transmission/reception device may further include: at least one bandpass filter (BPF) allowing only a signal of a specific band of the received signal to pass therethrough; at least one reception unit converting each received signal into a baseband signal; and at least one transmission unit converting a baseband signal of each signal to be transmitted into a wireless signal.

The beamforming antenna may be configured to transmit or receive at least one of the AIS signal, the ASM signal, the VDE signal, and the satellite (SAT) signal, the BPF may be configured to allow only specific band signal of at least one among the AIS signal, the ASM signal, the VDE signal, and the satellite (SAT) signal to pass therethrough, the transmission unit may be configured to transmit at least one of the AIS signal, the ASM signal, and the VDE signal, and the reception unit may be configured to receive at least one of the AIS signal, the ASM signal, the VDE signal, and the satellite (SAT) signal.

According to the method for controlling a beamforming antenna to enhance transmitting/receiving performance and the wireless communication device performing the same in a wireless communication of the present disclosure, a beamforming direction of the beamforming antenna may be controlled on the basis of slot occupancy and plan information and RSSI comparison and analysis information received from other stations (other mobile stations or base stations). Thus, an influence of collision and interference that may occur as a transmission operation is performed at the same slot time in a case in which other stations (other mobile stations and base stations) cannot share slot occupancy and plan information may be reduced. Also, network usage efficiency may be enhanced, and an error rate may be reduced and a maritime communication arrival distance may be extended through enhancement of transmitting/receiving performance.

In addition, the present disclosure may be applied to a VHF data exchange system (VDES), and even when the present disclosure is applied to the VDES, network usage efficiency may be enhanced by reducing an influence of a collision and interference of signals transmitted from other stations (other mobile stations or base stations), an error rate may be reduced through enhancement of transmitting/receiving performance, and a maritime communication arrival distance may be extended.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
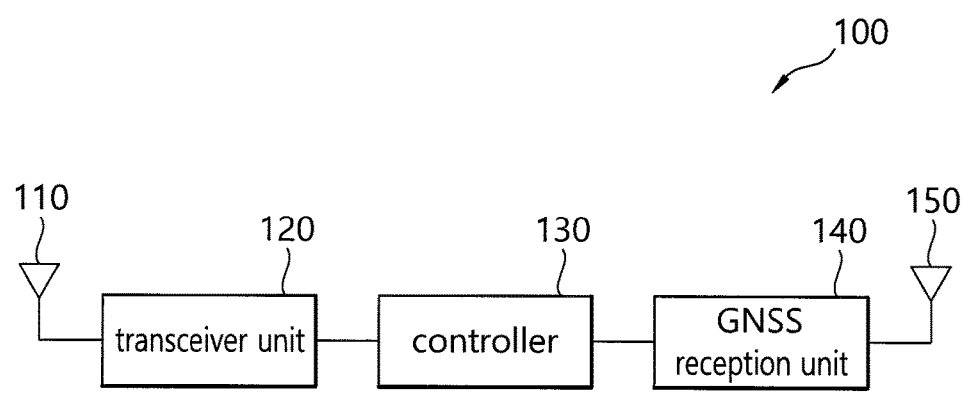
FIG. 1 is a schematic configuration diagram of a general a time division multiple access (TDMA) based wireless communication device having omnidirectional antenna.

The present invention may be modified variably and may have various embodiments, particular examples of which will be illustrated in drawings and described in detail. However, it is to be understood that the present invention is not limited to a specific disclosed form, but includes all modifications, equivalents, and substitutions without departing from the scope and spirit of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention. The term "and/or" includes a combination of a plurality of relevant items or any one of a plurality of relevant items. It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms have the same meaning as those that are generally understood by those skilled in the art to which the present invention pertains. It must be understood that the terms defined by the dictionary are identical with the meanings within the context of the related art, and they should not be ideally or excessively formally defined unless the context clearly dictates otherwise.

In the present disclosure, a wireless communication device may be referred to as mobile station (MS), user equipment (UE), user terminal (UT), wireless terminal, access terminal (AT), fixed or mobile subscriber unit, subscriber station (SS), cellular phone, wireless device, wireless communication device, wireless transmit/receive unit (WTRU), moving node, mobile, mobile station, personal digital assistant (PDA), smartphone, laptop, net book, personal computer, wireless sensor, consumer electronic device (CE), or other terms.

Various embodiments of a wireless communication device may include an automatic identification system (AIS) transceiver, an application specific message (ASM) transceiver, a VHF data exchange (VDE) transceiver, or a VHF data exchange system (VDES) transceiver in maritime communication system, a cellular phone, a smart phone having a wireless communication function, a personal digital assistant (PDA) having a wireless communication function, a wireless modem, a portable computer having a wireless communication function, a photographing apparatus such as a digital camera having a wireless communication function, a wearable device having a wireless communication function, a gaming apparatus having a wireless communication function, a music storing and playing appliance having a wireless communication function, an Internet home appliance capable of wireless Internet accessing and browsing, and also portable units or terminals having a combination of such functions, but are not limited thereto.

In the present disclosure, a base station may include an advanced base station (ABS), an HR-BS, a site controller, a base transceiver system (BTS), an access point (AP), or a certain other type interfacing device operable in a wireless environment, but are not limited thereto. The base station (BS) may be part of a radio access network (RAN) that may include a base station controller (BSC), a radio network controller (RNC), a relay node, and/or network elements (not shown). The BS may be configured to transmit and/or receive wireless signals within a specific geographical area that may be referred to as a cell (not shown). The BS may also be called by other names such as a coast station, a land base station, a satellite base station, or other terms. An own station, a time division multiple access (TDMA) based wireless communication device, includes an AIS device, an ASM device, a VDE device, and a VDES device installed in a ship. Other station, a TDMA-based wireless communication device, includes an AIS device, an ASM device, a VDE device, and a VDES device installed in a ship, and represents a different mobile station or a base station.

Hereinafter, embodiments of the present invention will be described below in detail with reference to the accompanying drawings where those components are rendered the same reference number that are the same or are in correspondence, regardless of the figure number, and redundant explanations are omitted.

In the present disclosure, an own station continuously monitors slot occupancy status and plan information from a signal received from other station (i.e., a different mobile station or a base station) to create a slot map, and varies a beamforming direction of a beamforming antenna accordingly.

Thus, in the present disclosure, a beam is formed in a specific direction in a corresponding slot time according to a future slot occupancy plan of other station to thus reduce an error rate and extend a distance range through enhancement of transmitting/receiving performance.

Figure 2:
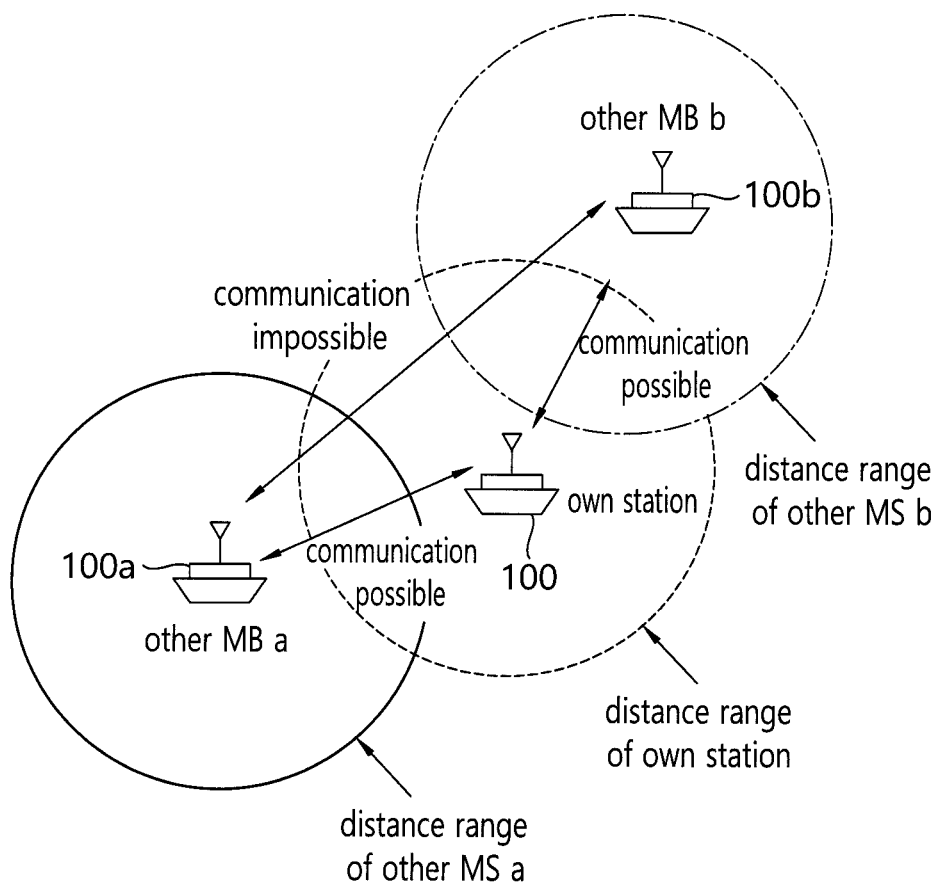
FIG. 2 is a view illustrating an example of distance ranges between an own station and other mobile stations.

Also, as illustrated in FIG. 2, in the present disclosure, in a case in which an own station is not able to normally receive transmission information of both other mobile station (MS) a 100-*a* and other MS b 100-*b* due to a transmission slot collision and interference therebetween, a beam is formed in a direction in which signal strength is a reference value or greater through analyzed received signal strength indicator (RSSI) information, whereby at least one other station information may be received.

Hereinafter, embodiments of a method for controlling a beamforming antenna to enhance transmitting/receiving performance and a wireless communication device performing the same in a TDMA-based wireless communication system of the present disclosure will be described.

In an embodiment, the present disclosure may be applied to an automatic identification system (AIS) transmission/reception device of a maritime communication system.

Table 1 shows a reporting interval of a marine mobile device for CLASS A ship disclosed in ITU-R M.1371-5.

TABLE 1

| Ship's dynamic conditions | Nominal reporting interval |
| --- | --- |
| Ship at anchor or moored and not moving faster than 3 knots | 3 min |
| Ship at anchor or moored and moving faster than 3 knots | 10 s |

TABLE 1-continued

| Ship's dynamic conditions | Nominal reporting interval |
| --- | --- |
| Ship 0-14 knots | 10 s |
| Ship 0-14 knots and changing course | 3⅓ s |
| Ship 14-23 knots | 6 s |
| Ship 14-23 knots and changing course | 2 s |
| Ship >23 knots | 2 s |
| Ship >23 knots and changing course | 2 s |

An AIS transmits a location reporting message including an identification code, a current location, a data link connection scheme, a slot occupancy status and plan, and the like of an own station in and transmits the same at a location reporting interval regulated according to dynamic conditions of a ship as illustrated in Table 1.

In the parameters of location report messages of the AIS (#1, #2, and #3 messages among the AIS messages), a communication state (formed of 19 bits) is a part regarding slot occupancy status and plan information (Please refer to ITU-R M.1371-5 Table 48, TABLE 49, ANNEX 2 3.3.7.2.2, 3.3.7.3.2).

The communication state is also included in a #4 message (base station report), a #9 message (Standard SAR aircraft position report), a #11 message (UTC/Date response), a #18 message (Standard Class B equipment position report), and a #26 message (Mult. slot binary message with Communications State), as well as in the location report messages among the AIS messages (#1, #2, and #3 messages among the AIS messages). For example, in a case in which an access scheme is a self-organizing time division multiple access (SOTDMA) when an AIS message is transmitted, the communication state includes contents regarding whether a current transmission slot is to be maintained or when a transmission slot is to be changed. For example, in a case in which an access scheme is an incremental time division multiple access (ITDMA) when an AIS message is transmitted, the communication state includes contents regarding how many slots, starting from a current transmission slot, are to be used at which interval and whether to maintain the transmission slots in a next frame.

Figure 3:
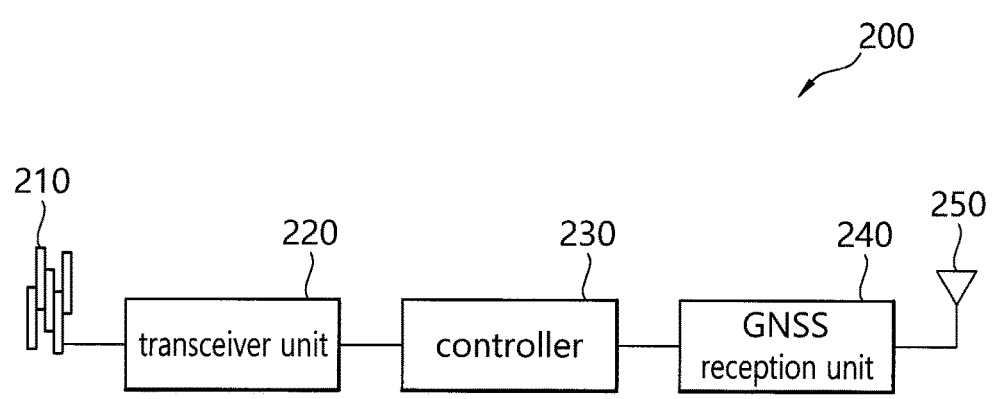
FIG. 3 is a schematic block diagram of a TDMA-based wireless communication device having a beamforming antenna according to an embodiment of the present disclosure.

FIG. 3 is a schematic block diagram of a TDMA-based wireless communication device 200 having a beamforming antenna according to an embodiment of the present disclosure. Referring to FIG. 3, the wireless communication device 200 of the present disclosure includes a beamforming antenna 210, a transceiver unit 220, a controller 230, a GNSS reception unit 240, and a GNSS antenna 250.

The beamforming antenna 210 includes a plurality of omnidirectional antennas, including a central main antenna and a peripheral parasitic antennas. The peripheral parasitic antennas may be arranged to circularly surround the central main antenna, and the number of directions of beams may be adjusted according to the number of peripheral parasitic antennas.

The transceiver unit 220 is part for receiving a signal from other station or transmitting a signal to other station through the beamforming antenna 210. The transceiver unit 220 may include one or more transmitters and one or more receivers. The transceiver unit 220 may include a radio frequency (RF) switch switching a transmission operation and a reception operation, a band pass filter, a low pass filter, a low noise amplifier, and the like.

The controller 230 analyzes a signal received from other station to determine a beamforming pattern of the beamforming antenna 210. The controller 230 also may perform signal coding, data processing, power control, input/output processing, and/or a certain other function enabling the wireless communication device 200 to operate in a wireless environment. That is, the controller 230 performs a driving process of the wireless communication device 200, generation and analysis, recording and storing, controlling transmission and reception, and formation of synchronization of various types of input/output information.

The controller 230 may be coupled to the transceiver unit 220 and the GNSS reception unit 240. The controller 230 may be implemented as a general-purpose processor, a special-purpose processor, a conventional processor, a digital signal processor (DSP), a microprocessor, one or more microprocessors associated with a DSP core, a controller, a micro-controller, application specific integrated circuits (ASICs), a field programmable gate array (FPGA) circuits, an integrated circuit (IC), a status machine, and the like.

The GNSS reception unit 240 receives satellite signals from GNSS satellites through the GNSS antenna 250 and transfers time, location, and synchronization information to the controller 230.

In FIG. 3, the transceiver unit 220, the controller 230, and the GNSS reception unit 240 are illustrated as separate components, but the transceiver unit 220, the controller 230, and the GNSS reception unit 240 may be integrated together with an electronic package or chip so as to be implemented.

Figure 4:
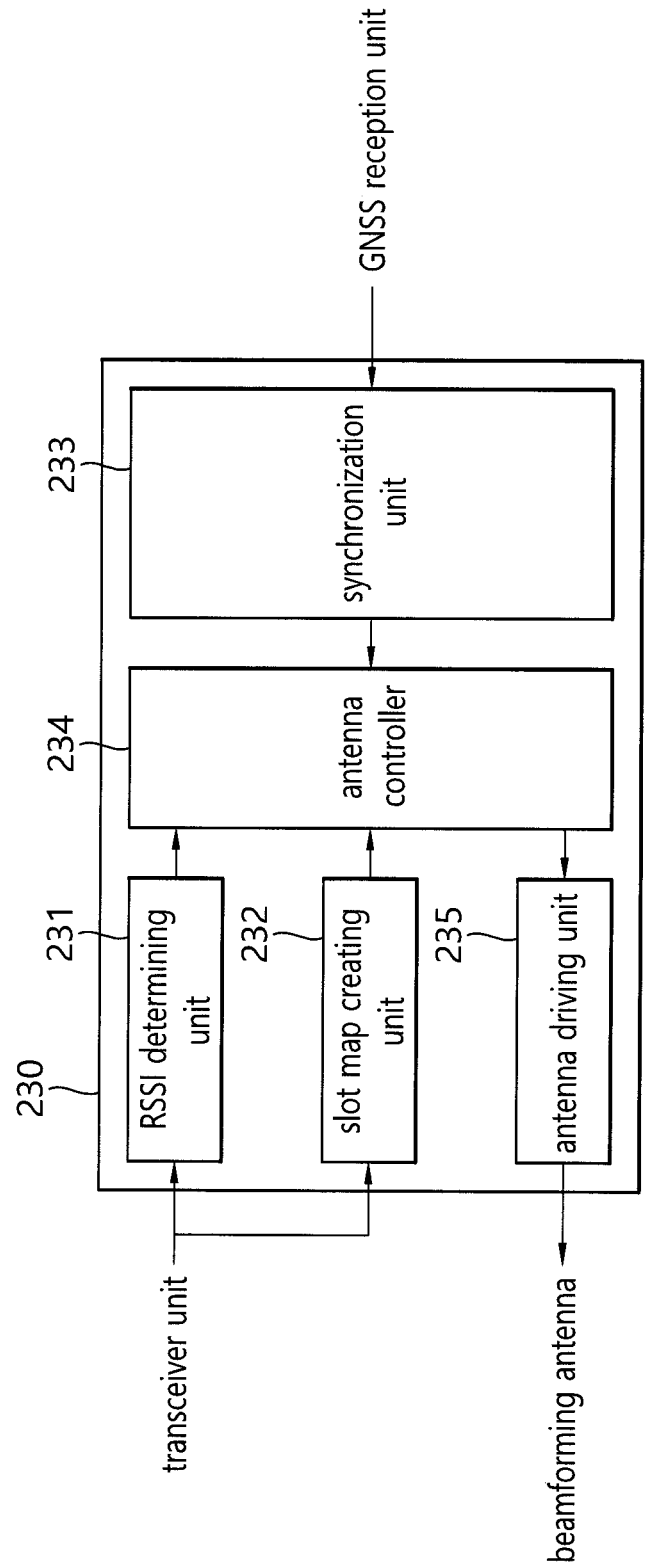
FIG. 4 is a functional block diagram of a controller of a wireless communication device according to an embodiment of the present disclosure.

FIG. 4 is a functional block diagram of a controller of a wireless communication device according to an embodiment of the present disclosure.

The controller 230 includes an RSSI determining unit 231 determining whether other station has transmitted a signal by comparing strength of a signal received by the transceiver unit 220 with an RSSI reference value, a slot map creating unit 232 creating a slot map according to slot occupancy status and plan information included in the signal received by the transceiver unit 220, a synchronization unit 233 receiving location and time information from the GNSS reception unit 240 and performing synchronization on the wireless communication device, an antenna controller 234 generating control information of a beamforming direction of the beamforming antenna 210 using determination results from the RSSI determining unit 231 and the created slot map from the slot map creating unit 232, and an antenna driving unit 235 driving the beamforming antenna 210 to form a beam according to control information from the antenna controller 234.

The RSSI determining unit 231 determines whether RSSI of the reception signal transferred from the transceiver unit 220 is a preset reference value or greater to determine whether other station has transmitted a signal. When it is determined that other station has transmitted a signal, the RSSI determining unit 231 records and stores a corresponding slot time and a reception direction in a memory (not shown).

The slot map creating unit 232 analyzes a slot occupancy status and plan information from the received signal and stores the same in the memory (not shown). For example, in a case in which the wireless communication device 200 is an AIS transceiver, it may analyze and create a slot occupancy status and plan information only when communication state information is included in a received AIS message, and in other cases, it creates a slot occupancy status and plan information with a free slot (i.e., a slot not occupied by other station).

The antenna controller 234 generates control information to form a beam in a direction designated in a specific slot time on the basis of the reception direction and the slot occupancy status and plan information read from the memory, and store the generated control information in the memory (not shown).

The antenna driving unit 235 serves to form a beam in the direction designated in the specific slot time by controlling the parasitic antennas constituting the beamforming antenna 210 on the basis of control information read from the memory.

When a reception mode starts or during free slot time (i.e., a slot time not occupied by other station), the antenna driving unit 235 tracks signals from other stations by rotating (about 360° rotation) a beam from the beamforming antenna 210 one time at every slot time. In a case in which the wireless communication device 200 simultaneously receives signals from two or more other stations via a plurality of channels, the antenna driving unit 235 may simultaneously form beams in two or more directions. That is, since the antenna driving unit 235 is able to form a beam in a direction of other station designated in a specific slot time by each channel, a plurality of beams may be simultaneously formed.

The synchronization unit 233 serves to form a link access synchronization for transmission of the own station and reception of other station upon receiving location and time information from the GNSS reception unit 240.

Figure 5:
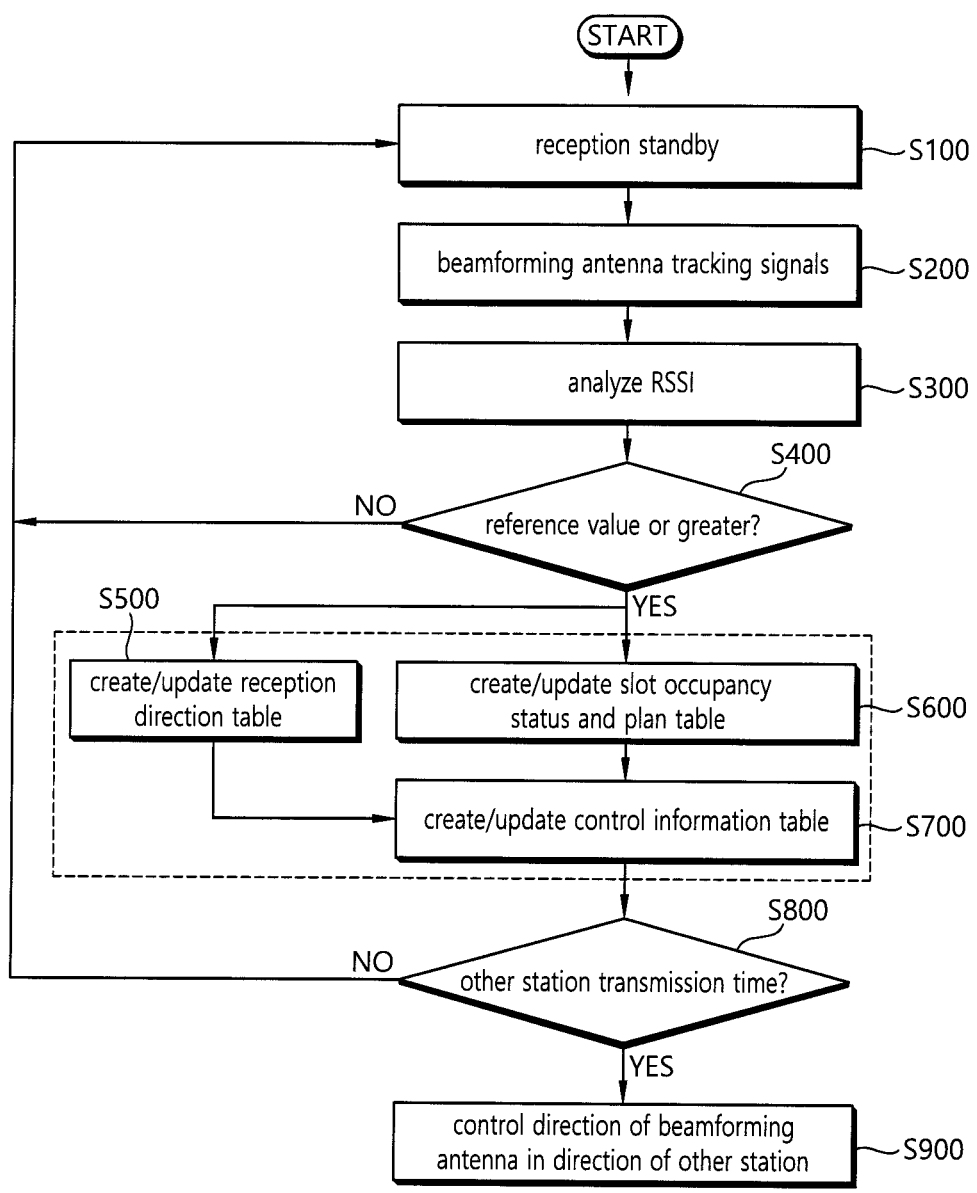
FIG. 5 is a flow chart illustrating a method for controlling a beamforming antenna according to an embodiment of the present disclosure.

FIG. 5 is a flow chart illustrating a method for controlling a beamforming antenna according to an embodiment of the present disclosure. Referring to FIG. 5, when the reception mode starts, the wireless communication device is in a reception standby state (S100).

When a reception mode starts or during free slot time (i.e., a slot time not occupied by other station), the wireless communication device in the reception standby state tracks signals from other stations by rotating (about 360° rotation) a beam from the beamforming antenna 210 one time at every slot time (S200).

The wireless communication device analyzes RSSIs of the tracked signals (S300).

Thereafter, the wireless communication device compares the analyzed RSSIs with a predetermined RSSI reference value to determine whether signals have been transmitted from other stations (S400).

The reason for comparing the RSSIs of received signals with the predetermined RSSI reference value is as follows.

When information transmitted from a transmitter is received by a receiver, it has a specific RSSI. When a transmission output is weak, when it is a long distance, or when a propagation environment is poor, the RSSI is measured to be low, and when a transmission output is strong, when it is a short distance, or when a propagation environment is good, the RSSI is measured to be high. Thus, in a communication system in which a transmission output is uniform, when a signal of a preset RSSI or higher is measured on the basis of a preset RSSI in accordance with reception sensitivity of the receiver, whether the transmitter has transmitted a signal via a corresponding channel may be determined. Also, whether a distance to the transmitter is short or long or whether a propagation environment is good or bad may be determined on the basis of the RSSI. That is, when an RSSI of a signal received from other station is the predetermined RSSI reference value or greater, it may be determined that other station has transmitted a signal via the corresponding channel.

When an RSSI of a signal received by the wireless communication device is less than the reference value, the wireless communication device returns to the reception standby state (S100).

When an RSSI of a signal received by the wireless communication device is equal to or greater than the reference value, the wireless communication device creates or updates a corresponding slot time and a reception direction in a reception direction table of the memory (S500).

Also, the wireless communication device analyzes slot occupancy status and slot occupancy plan information from a received signal to create or update a slot occupancy status and plan table (slot map) of the memory (S600).

The wireless communication device determines a beamforming direction of the beamforming antenna on the basis of the reception direction table and the information stored in the slot occupancy status and plan table (slot map) of the memory, and creates and updates a control information table of the memory (S700).

The wireless communication device determines whether a corresponding slot time is a slot time transmitting a signal from other station, with reference to the slot occupancy status and plan table (slot map) (S800).

When the corresponding slot time is not a slot time transmitting a signal from other station, the wireless communication device returns to a reception standby state (S100).

When the corresponding slot time is a slot time transmitting a signal from other station, the wireless communication device controls a beamforming direction of the beamforming antenna in a direction of the other station transmitting a signal with reference to the control information table (S900).

TABLE 2

| Slot No. | 0 | 1 | 2 | 3 | ... | 2246 | 2247 | 2248 | 2249 |
|---|---|---|---|---|---|---|---|---|---|
| Direction | *T | 5 | 3 | 1 | ... | 2 | *T | 8 | 7 |

(*T: Tracking)

Table 2 shows an example of a reception direction table in which reception directions are based on eight-direction beamforming antenna tracking information. Referring to Table 2, #0 and #2247 slots are intervals in which signals from other stations are tracked by rotating a beam of the beamforming antenna 210 one time (about 360° rotation) at every slot time. A reception direction table may be created or updated by indicating such that #1 slot is an interval in which a signal is received in #5 direction among beamforming directions of the beamforming antenna and #2 slot is an interval in which a signal is received from #3 direction among the beamforming directions of the beamforming antenna.

TABLE 3

| Slot. No. | 0 | 1 | 2 | 3 | ... | 2246 | 2247 | 2248 | 2249 |
|---|---|---|---|---|---|---|---|---|---|
| Slot occupancy status/plan | **F | ***E | ***E | ***E | ... | ***E | **F | ***E | ***E |

(F: Free, *E: Externally Allocated)

Table 3 illustrates an example of a slot occupancy status and plan table (slot map). Referring to Table 3, #0 slot and #2247 slot are free slots not currently occupied, while #1, #2, #2246, #2248, and #2249 slots are slots already occupied by other stations.

Figure 6A:
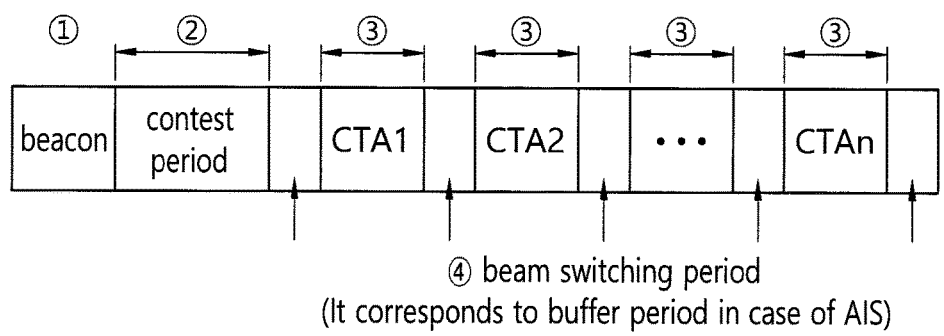
FIGS. 6A and 6B are views illustrating a beamforming operation frame structure and beam patterns of a wireless communication device according to an embodiment of the present disclosure.
Figure 6B:
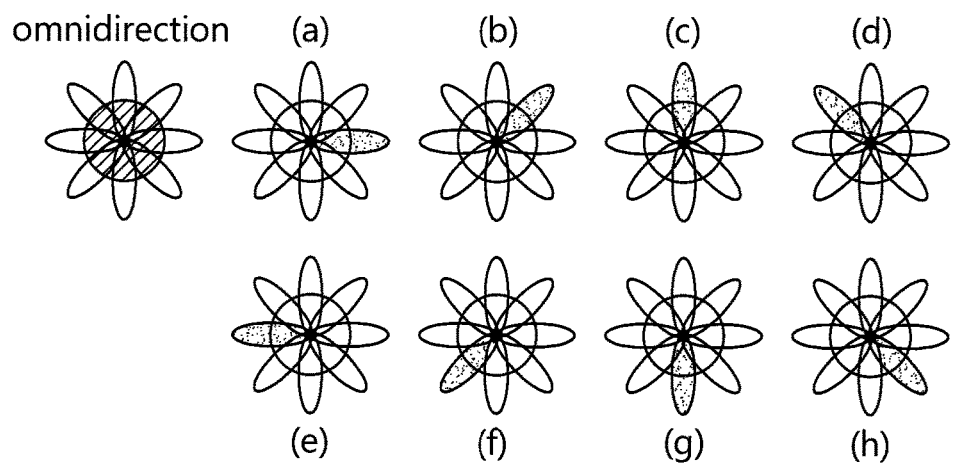

FIGS. 6A and 6B are views illustrating a beamforming operation frame structure and beam patterns of a wireless communication device according to an embodiment of the present disclosure.

FIG. 6A is a view illustrating an example of a beamforming operation frame structure of the wireless communication device. Referring to the operation frame of FIG. 6A, section ① is a section in which the wireless communication device receives a beacon frame from a base station and adjusts a configuration or synchronization of the wireless communication device. Section ② is a section in which when a reception mode starts, the wireless communication device tracks signals from other stations by rotating a beam of the beamforming antenna 210 one time (about 360° rotation) at every slot time. Section ③ (channel time allocation (CTA)) is a section in which the wireless communication device forms a beam on the basis of a location and slot occupancy status and plan information of other station. That is, in this section, the wireless communication device forms a beam in a direction toward the corresponding other station at a corresponding slot time according to a slot time at which the other station transmits a signal. Section ④ is a section in which the wireless communication device performs switching to change a beamforming pattern of the beamforming antenna, and in the case of the AIS, this section corresponds to a buffer section.

FIG. 6B illustrates an example of a case in which the beamforming antenna has eight parasitic antennas and thus the wireless communication device is able to adjust beam forming direction to eight directions. As illustrated in FIG. 6B, when the beamforming antenna has eight parasitic antennas, the beamforming antenna is able to form beams in eight specific directions (a to h), as well as omnidirectional beams. Here, the beamforming antenna forms a beam in a direction toward the other station which occupies each slot with reference to the aforementioned operation frame.

(a) to (h) of FIG. 6B are examples of a case in which the wireless communication device receives a signal via a single channel, but in a case in which the wireless communication device simultaneously receives signals respectively from two or more other stations via a plurality of channels, beams may be simultaneously formed in two or more directions. That is, since beams may be formed in a direction toward the other station designated in a specific slot time by channels, a plurality of beams may be simultaneously formed.

In another example, the present disclosure may also be applied to other TDMA-based wireless communication device sharing a slot occupancy status and plan, as well as the AIS transmission/reception device in a maritime communication system.

For example, the present disclosure may also be applied to an application specific message (ASM) transmission/reception device and a VHF data exchange (VDE) transmission/reception device. The ASM transmission/reception device basically uses the same parameter as that of the AIS transmission/reception device, except for the use of an access scheme of ITMDA (Incremental Time Division Multiple Access), RATDMA (Random Access Time-Division Multiple Access), and FATDMA (Fixed Access Time-Division Multiple Access), excluding SOTDMA (Self Organized Time Division Multiple Access) of the AIS, and thus, the ASM transmission/reception device is able to create or update a slot map. Thus, based on this, it is possible to control a beamforming direction of the beamforming antenna.

In another example, in the case of the VDE transmission/reception device, slot allocation and plan information is included in a bulletin board message transmitted from a land base station or a satellite base station, and thus, a beamforming direction of the beamforming antenna may be controlled using the slot allocation and plan information.

In addition, even in a case in which a wireless communication is an integrated device formed by combining several maritime wireless communication transmission/reception devices (e.g., a VHF data exchange system (VDES) including all the AIS transmission/reception device, the ASM transmission/reception device, and the VDE transmission/reception device), a beamforming antenna control method of the present disclosure may also be applied thereto.

FIGS. 7A to 7G are views illustrating embodiments of a maritime wireless communication device employing a beamforming antenna according to other embodiments of the present disclosure.

Figure 7A:
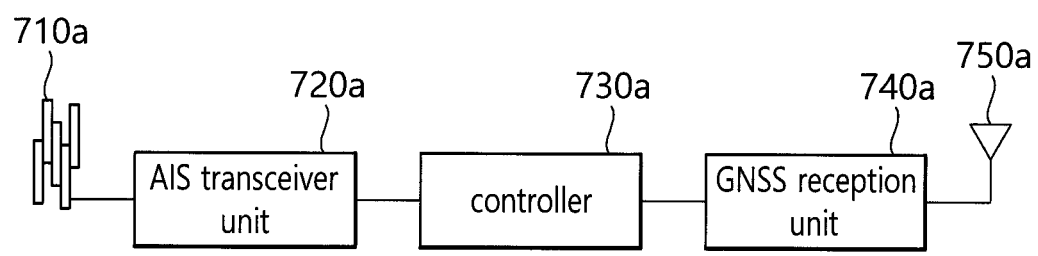
FIGS. 7A to 7G are views illustrating embodiments of a maritime wireless communication device having a beamforming antenna according to other embodiments of the present disclosure.
Figure 7B:
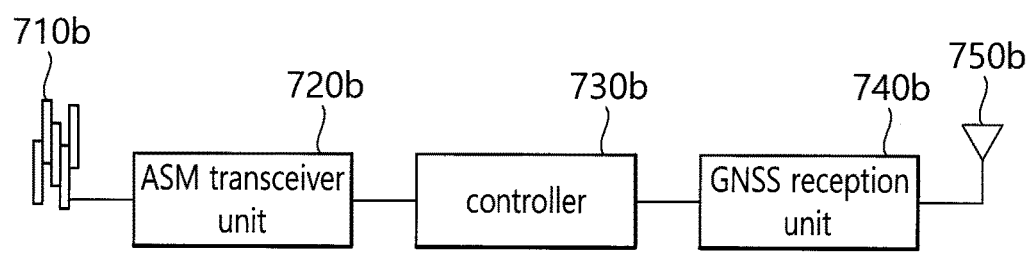
Figure 7C:
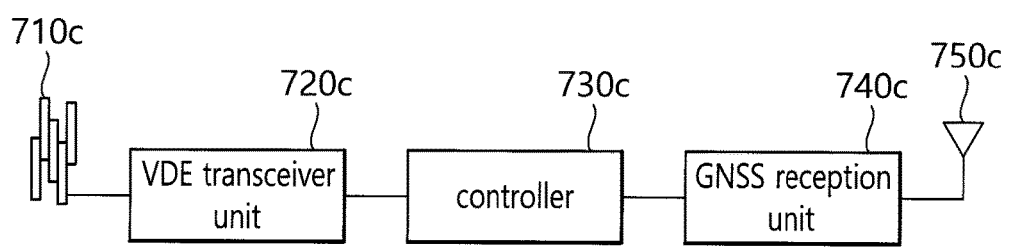

FIGS. 7A and 7C are views illustrating examples of wireless communication devices including one type of transceiver.

FIG. 7A is a schematic block diagram of an AIS transmission/reception device including a beamforming antenna 710a, an AIS transceiver unit 720a, a controller 730a, a GNSS reception unit 740a, and a GNSS antenna 750a.

FIG. 7B is a schematic block diagram of an ASM transmission/reception device including a beamforming antenna 710b, an ASM transceiver unit 720b, a controller 730b, a GNSS reception unit 740b, and a GNSS antenna 750b.

FIG. 7C is a schematic block diagram of an VDE transmission/reception device including a beamforming antenna 710c, an VDE transceiver unit 720c, a controller 730c, a GNSS reception unit 740c, and a GNSS antenna 750c.

FIGS. 7D to 7G illustrate examples of wireless communication devices including two or more types of transceivers.

Figure 7D:
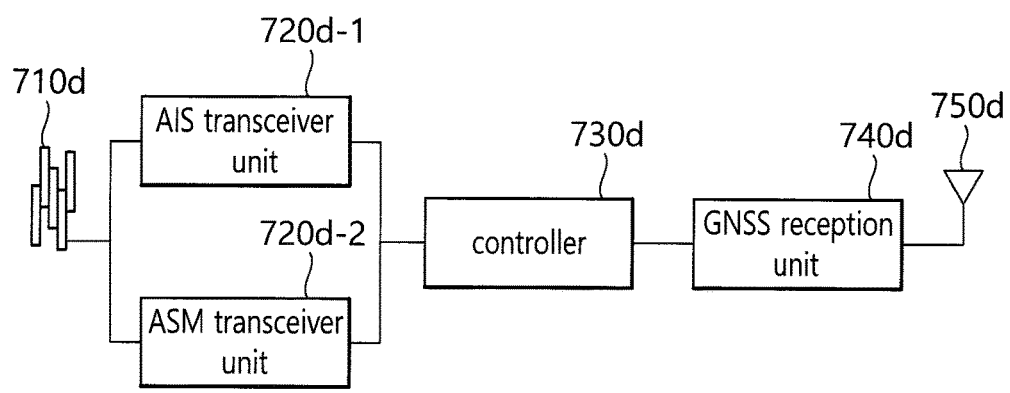

FIG. 7D is a schematic block diagram of a wireless communication device in which an AIS transceiver and an ASM transceiver are integrated. The wireless communication device includes a beamforming antenna 710d, an AIS transceiver unit 720d-1, an ASM transceiver unit 720d-2, a controller 730d, a GNSS reception unit 740d, and a GNSS antenna 750d.

Figure 7E:
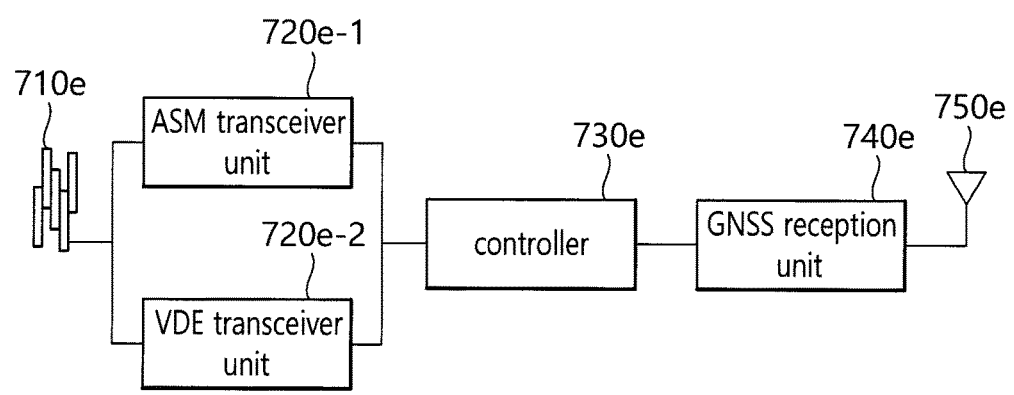

FIG. 7E is a schematic block diagram of a wireless communication device in which an ASM transceiver and a VDE transceiver are integrated. The wireless communication device includes a beamforming antenna 710e, an ASM transceiver unit 720e-1, an VDE transceiver unit 720e-2, a controller 730e, a GNSS reception unit 740e, and a GNSS antenna 750e.

Figure 7F:
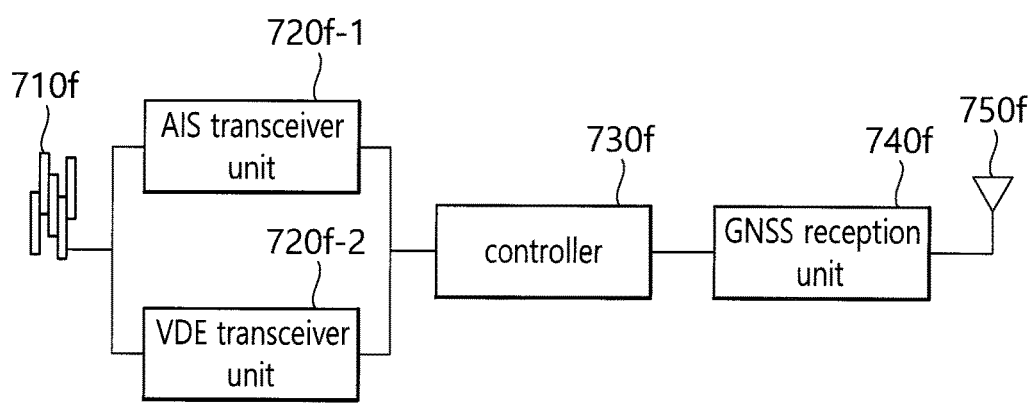

FIG. 7F is a schematic block diagram of a wireless communication device in which an AIS transceiver and a VDE transceiver are integrated. The wireless communication device includes a beamforming antenna 710f, an AIS transceiver unit 720f-1, a VDE transceiver unit 720f-2, a controller 730f, a GNSS reception unit 740f, and a GNSS antenna 750f.

Figure 7G:
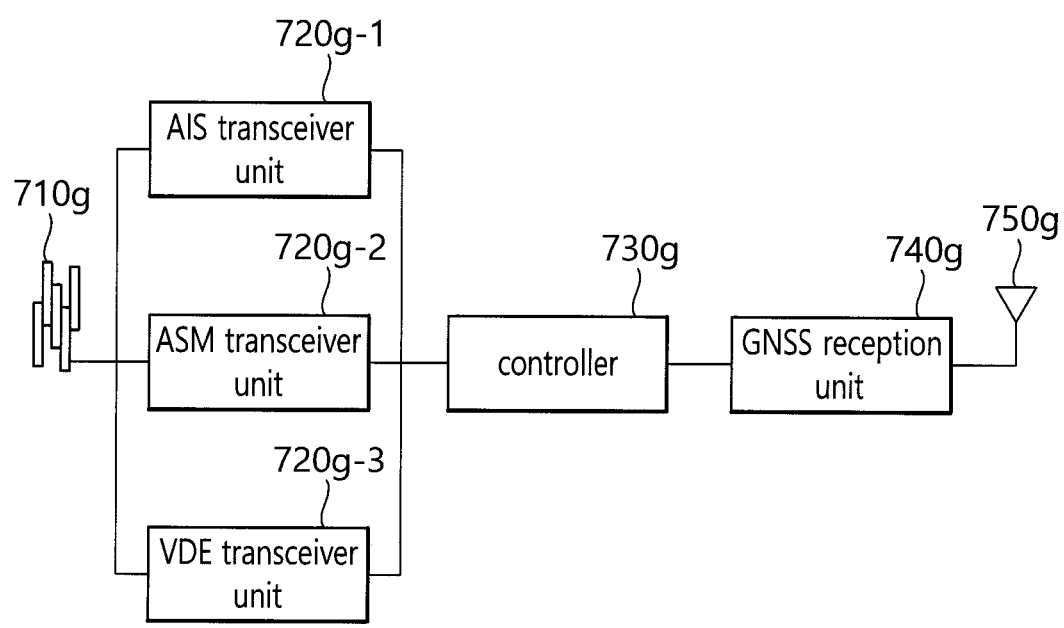

FIG. 7G is a schematic block diagram of a wireless communication device in which an AIS transceiver, an ASM transceiver, and a VDE transceiver are integrated. The wireless communication device includes a beamforming antenna 710g, an AIS transceiver unit 720g-1, an ASM transceiver unit 720g-2, and a VDE transceiver unit 720g-3, a controller 730g, a GNSS reception unit 740g, and a GNSS antenna 750g.

As illustrated in FIG. 7G, the AIS, ASM, and VDE-integrated system are called a VHF data exchange system (VDES).

Figure 8:
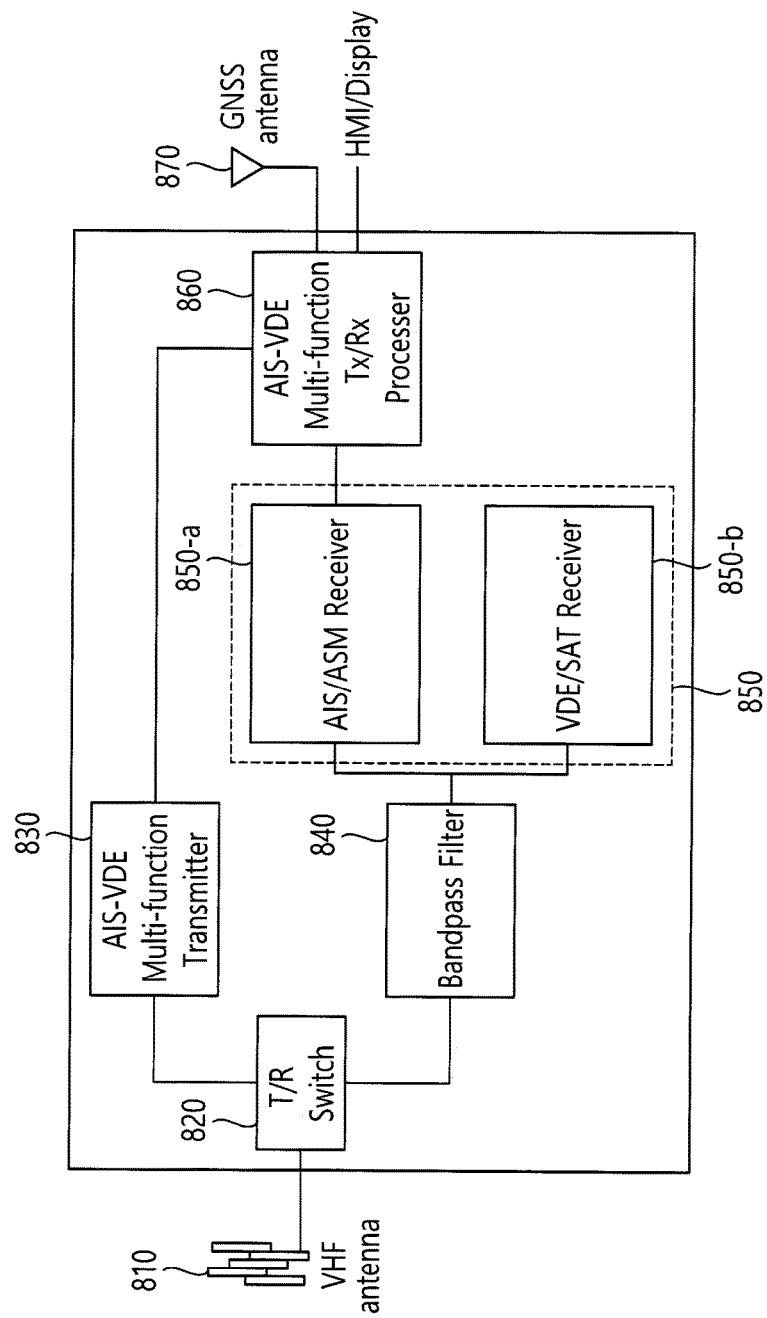
FIG. 8 is a view illustrating an implementation example of a VHF data exchange system (VDES) transceiver according to another embodiment of the present disclosure.

FIG. 8 is a view illustrating an implementation example of a VHF data exchange system (VDES) transceiver according to another embodiment of the present disclosure. Referring to FIG. 8, the VDES transceiver includes a VHF antenna 810, a transmit/receive (T/R) switch 820, an AIS-VDE multi-function transmitter 830, a bandpass filter (BPF) 840, a reception unit 850, a multi-function Rx/Tx processor 860, and a GNSS antenna 870.

The VHF antenna 810 is a beamforming antenna including a plurality of omnidirectional antennas. The beamforming antenna includes a central main antenna and a plurality of peripheral parasitic antennas for beamforming and may transmit or receive an AIS, ASM, VDE, and SAT (satellite) signals. Also, the VHF antenna 810 may be a single beamforming antenna or a plurality of beamforming antennas according to whether AIS, ASM, and VDE transmission units and reception units are separated or integrated. That is, a beamforming antenna may be individually connected to each of an AIS transceiver unit, an ASM transceiver unit, and a VDE transceiver unit, or only a single beamforming antenna may be connected to a combination of two or more thereof.

The T/R switch 820 is a switch used for conversion of a transmission mode and a reception mode.

The AIS-VDE multi-function transmitter 830 may convert a baseband signal of each signal (e.g., an AIS signal, an ASM signal, a VDE signal, etc.) into a wireless signal according to characteristics (a transmission output, a transmission frequency, etc.) required for a system, and transmit the same. Also, the AIS-VDE multi-function transmitter 830 may simultaneously or selectively transmit an AIS signal, an ASM signal, and a VDE signal.

The BPF 840 allows only a signal of a specific band to pass therethrough and restrain a signal of other band. The BPF 840 may allow only a signal of a specific band of at least one of an AIS signal, an ASM signal, a VDE signal, and an SAT signal to pass therethrough, and restrain a signal of other bands. For example, the BPF 840 may allow only a signal of a specific band of any one of the AIS signal, the ASM signal, the VDE signal, and the SAT signal to pass therethrough, and restrain a signal of other bands. Or, the BPF 840 may be realized as two or three BPFs allowing only a signal of a specific band of each of at least two or three signals among the AIS signal, the ASM signal, the VDE signal, and the SAT signal and restrain a signal of other bands such that at least two or three signals among the AIS signal, the ASM signal, the VDE signal, and the SAT signal are simultaneously received. Or, the BPF 840 may be realized as a separate BPF for each signal such that the AIS signal, the ASM signal, the VDE signal, and the SAT signal may be simultaneously received.

The reception unit 850 includes an AIS/ASM receiver 850-a and a VDE/SAT receiver 850-b. The reception unit 850 may convert each of the reception signals (e.g., the AIS signal, the ASM signal, the VDE signal, and the SAT signal, etc.) into a baseband signal. Also, the reception unit 850 may simultaneously or selectively receive the AIS signal, the ASM signal, the VDE signal, and the SAT signal.

The AIS-VDE multi-function transmitter 830 and the reception unit 850 may include several combinations according to whether AIS, ASM, and VDE transmission units and reception units are separated or integrated.

The multi-function Tx/Rx processor 860 may serve as a controller controlling and managing the entirety of the VDES transceiver such as message creation, message analysis, slot map management, and the like. Thus, the multi-function Tx/Rx processor may perform the method for controlling the beamforming antenna according to the embodiments of the present disclosure described above. That is, the multi-function Tx/Rx processor 860 may serve as the controller 230 of FIGS. 3 and 4.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A maritime wireless communication device performing a method for controlling a beamforming antenna to enhance transmitting/receiving performance in a time division multiple access (TDMA) based wireless communication system, the maritime wireless communication device comprising:
   a beamforming antenna configured with omnidirectional antennas, which include a central antenna and a plurality of parasitic antennas;
   a transceiver to receive a signal from other station or transmit the signal to the other station through the beamforming antenna; and
   a processor coupled to the transceiver, the processor configured to:
   compare a signal strength of the received signal with a predetermined reference value;
   when the signal strength of the received signal is equal to or greater than the predetermined reference value, generate a reception direction information including a corresponding slot time and a reception direction;
   generate a slot map by analyzing a slot occupancy status and plan information from the received signal; and
   control a beamforming direction of the beamforming antenna based on the generated reception direction information and the generated slot map,
   wherein the beamforming direction of the beamforming antenna is adjusted based on a location of the other station, the slot occupancy status of the other station, and the plan information of the other station,
   wherein the location of the other station, the slot occupancy status of the other station, and the plan information of the other station are included in a location reporting message,
   wherein the location reporting message is transmitted with a location reporting interval, which is regulated according to dynamic conditions of a ship, and
   wherein, when transmission information of two or more stations is not received normally due to a transmission slot collision and/or an interference, signal strengths of two or more stations are analyzed, and the beamforming direction of the beamforming antenna is further adjusted into a direction of station having a value of the signal strength that is equal to or greater than the predetermined reference value.

2. The wireless communication device of claim 1, wherein the processor controls the beamforming direction of the beamforming antenna on the basis of signal strength of the received signal, the slot occupancy status, and the plan information of the received signal.

3. The wireless communication device of claim 2, wherein the processor is further configured to:
   generate control information of the beamforming antenna by determining whether the signal has been transmitted; and
   operate the beamforming antenna to form a beam according to the control information.

4. The wireless communication device of claim 3, wherein the processor is further configured to create the control information to form the beam in a direction designated in a specific slot time on the basis of the reception direction information and the slot map.

5. The wireless communication device of claim 3, wherein the processor is further configured to form the beam in a direction designated in a specific time slot by controlling the parasitic antennas of the beamforming antenna on the basis of the control information.

6. The wireless communication device of claim 5, wherein the processor is further configured to track signals from other station by rotating a beam of the beamforming antenna at about 360° at every slot time when a reception mode starts or during a slot time in which information of other station is not present in the control information.

7. The wireless communication device of claim 1, wherein the wireless communication device further comprising a global navigation satellite system (GNSS) antenna,
   wherein the transceiver coupled to the GNSS antenna, the transceiver configured to:
   receive or transmit at least one of an automatic identification system (AIS) signal, an application specific message (ASM) signal, and a VHF data exchange (VDE) signal through the beamforming antenna; and
   receive satellite signals from GNSS satellites through the GNSS antenna, and transfer at least one of time, location, and/or synchronization information to the processor.

8. A method for controlling a beamforming antenna to enhance transmitting/receiving performance in a maritime time division multiple access (TDMA) based wireless communication system, the method comprising:
   receiving, by a wireless communication device having the beamforming antenna configured with omnidirectional antennas, which include a central antenna and a plurality of parasitic antennas, a signal through a transceiver coupled to the beamforming antenna from other station;
   comparing a signal strength of the received signal with a predetermined reference value;
   when the signal strength of the received signal is equal to or greater than the predetermined reference value, generating a reception direction information including a corresponding slot time and a reception direction;
   generating a slot map by analyzing a slot occupancy status and plan information from the received signal; and
   controlling a beamforming direction of the beamforming antenna based on the generated reception direction information and the generated slot map,
   wherein the beamforming direction of the beamforming antenna is adjusted based on a location of the other station, the slot occupancy status of the other station, and the plan information of the other station, wherein the location of the other station, the slot occupancy status of the other station, and the plan information of the other station are included in a location reporting message, wherein the location reporting message is transmitted with a location reporting interval, which is regulated according to dynamic conditions of a ship, and wherein, when transmission information of two or more stations is not received normally due to a transmission slot collision and/or an interference, signal strengths of two or more stations are analyzed, and the beamforming direction of the beamforming antenna is further adjusted into a direction of station having a value of the signal strength that is equal to or greater than the predetermined reference value.

9. The method of claim 8, wherein the beamforming direction of the beamforming antenna is controlled based on the signal strength of the received signal and the slot occupancy status and the plan information of the received signal.

10. The method of claim 9, wherein the controlling of the beamforming direction comprises a first operation of generating control information of the beamforming antenna by determining whether the signal has been transmitted and a second operation of enabling the beamforming antenna to form a beam according to the control information.

11. The method of claim 10, wherein, in the first operation, the control information is created to form the beam in a direction designated in a specific slot time on the basis of the reception direction information and the slot map.

12. The method of claim 10, wherein, in the second operation, the beam is formed in a direction designated in a specific time slot by controlling the parasitic antennas of the beamforming antenna on the basis of the control information.

13. The method of claim 12, wherein, in the second operation, when a reception mode of the wireless communication device starts or during a slot time in which information of other station is not present in the control information, signals from other station are tracked by rotating a beam of the beamforming antenna at about 360° at every slot time.

14. A VHF data exchange system (VDES) transmission/reception device performing a method for controlling a beamforming antenna to enhance transmitting/receiving performance in the VHF data exchange system, the VDES transmission/reception device comprising:

a beamforming antenna configured with omnidirectional antennas, which include a central antenna and a plurality of parasitic antennas;

a transceiver to receive at least one of an automatic identification system (AIS) signal, an application specific message (ASM) signal, an VHF data exchange (VDE) signal, and a satellite (SAT) signal through the beamforming antenna or transmit at least one of the AIS signal, the ASM signal, the VDE signal, and the SAT signal through the beamforming antenna; and a multi-function transmission/reception processor coupled to the transceiver, the processor configured to:

compare a signal strength of the received signal with a predetermined reference value;

when the signal strength of the received signal is equal to or greater than the predetermined reference value, generate a reception direction information including a corresponding slot time and a reception direction;

generate a slot map by analyzing a slot occupancy status and plan information from the received signal; and control a beamforming direction of the beamforming antenna based on the generated reception direction information and the generated slot map, wherein the beamforming direction of the beamforming antenna is adjusted based on a location of the other station, the slot occupancy status of the other station, and the plan information of the other station, wherein the location of the other station, the slot occupancy status of the other station, and the plan information of the other station are included in a location reporting message, wherein the location reporting message is transmitted with a location reporting interval, which is regulated according to dynamic conditions of a ship, and wherein, when transmission information of two or more stations is not received normally due to a transmission slot collision and/or an interference, signal strengths of two or more stations are analyzed, and the beamforming direction of the beamforming antenna is further adjusted into a direction of station having a value of the signal strength that is equal to or greater than the predetermined reference value.

15. The VDES transmission/reception device of claim 14, wherein at least one bandpass filter (BPF) allows only a signal of a specific band of the received signal to pass there through, and wherein the transceiver is further configured to:

convert each received signal into a baseband signal; and convert the baseband signal of each signal to be transmitted into a wireless signal.

16. The VDES transmission/reception device of claim 15, wherein the transceiver configured to:

transmit or receive at least one of the AIS signal, the ASM signal, the VDE signal, and the satellite (SAT) signal, allow only specific band signal of at least one among the AIS signal, the ASM signal, the VDE signal, and the satellite (SAT) signal, transmit at least one of the AIS signal, the ASM signal, and the VDE signal, and receive at least one of the AIS signal, the ASM signal, the VDE signal, and the satellite (SAT) signal.

* * * * *